Figure 1:
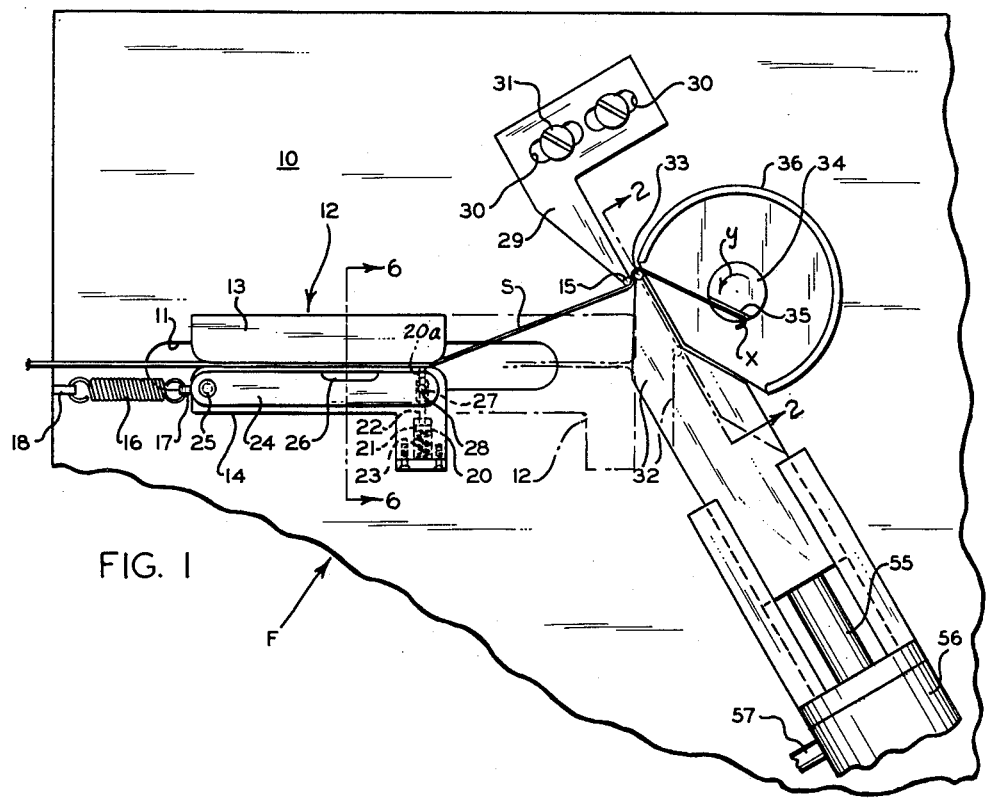

Aug. 25, 1964        C. ZELNICK ET AL        3,145,759
APPARATUS FOR MAKING POWER SPRINGS
Filed June 11, 1959                                3 Sheets-Sheet 1

INVENTORS
CHARLES ZELNICK
HENRY A. DOSTER
BY ALDEN D. SWARTZ

ATTORNEYS

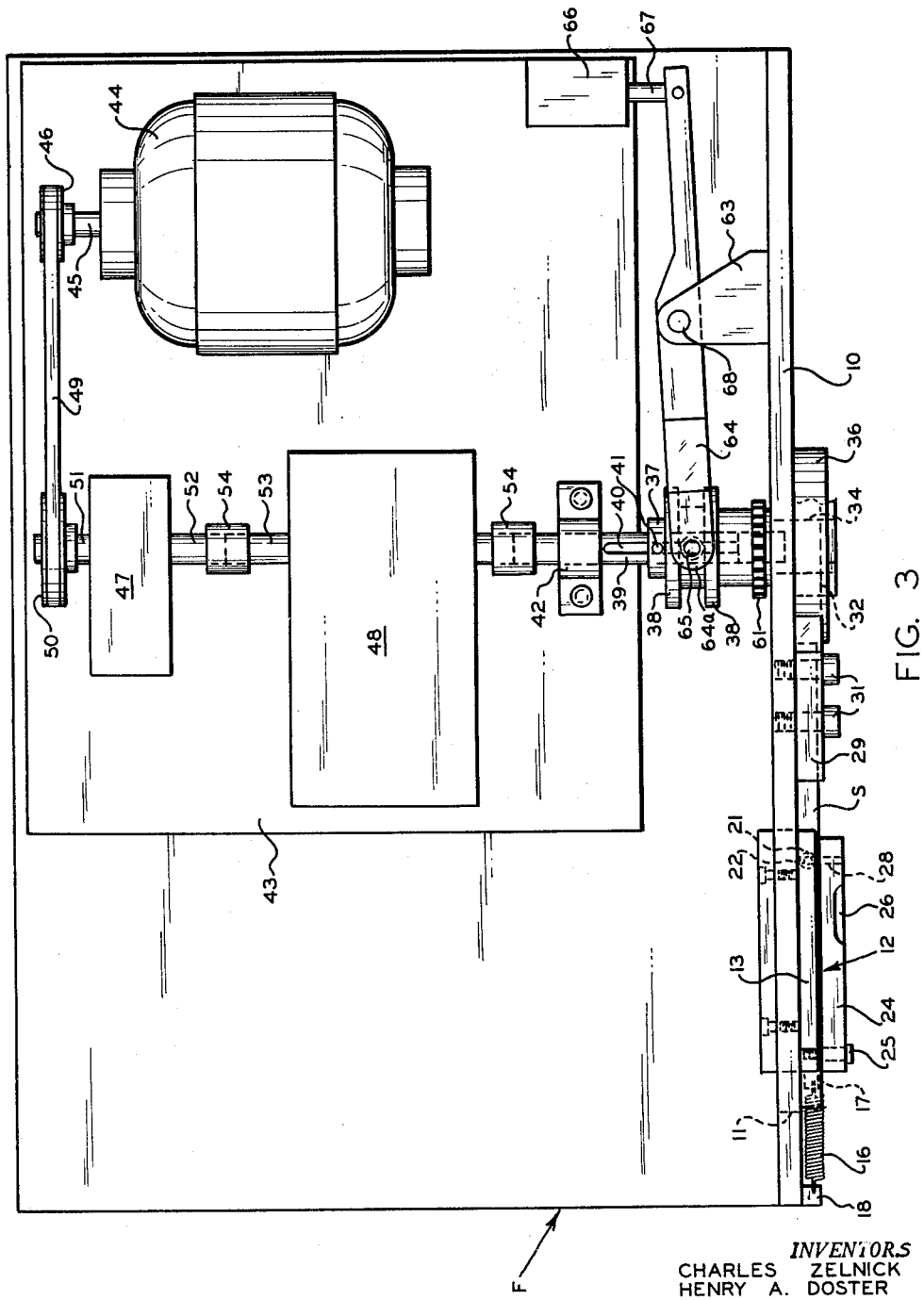

Aug. 25, 1964 C. ZELNICK ET AL 3,145,759
APPARATUS FOR MAKING POWER SPRINGS
Filed June 11, 1959 3 Sheets-Sheet 3

*INVENTORS*
CHARLES ZELNICK
HENRY A. DOSTER
BY ALDEN D. SWARTZ

ATTORNEYS

United States Patent Office 3,145,759
Patented Aug. 25, 1964

3,145,759
APPARATUS FOR MAKING POWER SPRINGS
Charles Zelnick, Henry A. Dosier, and Alden D. Swartz, Saginaw, Mich., assignors to Lufkin Rule Company, Saginaw, Mich., a corporation of Michigan
Filed June 11, 1959, Ser. No. 819,719
6 Claims. (Cl. 153—64)

This invention relates to a method of making and apparatus for forming power springs for spring drums of the type employed in power retracting measuring tapes and tape measures and to certain novel and useful improvements therein.

A spring of the type to which we refer is disclosed in Patents Nos. 2,833,027 and 2,833,534 which relate to the spring and a method of assembling the spring. Springs of this type which are termed Spir'ator springs have been formed and assembled in a different manner than that which is disclosed in the instant application. Cook Patent No. 2,647,743, for example, shows apparatus which can be employed to place a permanent set of desired curvature in a linear spring strip and, once the spring strip is provided with a set, it is permitted to coil naturally in engaging convolutions so that the end which was its leading end when the spring passed through the set imparting rolls becomes the inner end of the coiled spring. The coiled spring thus formed is in present practice then thermally processed or tempered by placing it in a tempering oven which stress relieves the coils. Thereafter the spring is backwound, starting with the outer end of the coiled spring, which was the trailing end of the spring strip at the time the permanent set was placed in the spring strip. This procedure has certain disadvantages which the invention disclosed in the instant application avoids or overcomes.

Briefly, in the method of the present invention the portion of the spring strip extending from permanent set imparting pins through which the strip passes is secured to a backwinding arbor which winds the strip in a direction to reverse the curvature permanently set in it, commencing with the leading end as it comes from the set imparting pins. The backwinding arbor is of relatively large diameter relative to the diameter of the presetting pins such that the permanent set of the spring strip backwinding on the arbor is not affected by the backwinding operation. Once the strip has been backwound on the arbor, a spring drum can then be placed over the backwound strip and the spring can be released so that it is accommodated within the drum. Since the radius of curvature permanently set in the spring strip is gradually increased as the spring proceeds through the set imparting pins in order to provide a spring for measuring tapes which will retract the tape at a relatively constant speed regardless of the length of measuring tape extended from the tape casing, the leading end of the spring strip when it passes through the permanent set imparting pins should be the inner end when the spring is in backwound condition. In the practice of the instant process it has been found unnecessary to temper or stress relieve the spring strip after the permanent set has been imparted.

One of the prime objects of the present invention is to discover a method of providing a Spir'ator type spring for a spring drum or the like in which the leading end of the spring as it comes from the set imparting pins is backwound on an arbor from which it can be easily disengaged when the drum is placed over the backwound strip.

A further object of the invention is to provide a novel method of furnishing a spring drum with a Spir'ator type spring which eliminates steps performed in previous methods and more rapidly and economically accomplishes the desired result.

Another object of the invention is to provide novel apparatus for performing the method which is reliable and efficient in operation and can be easily operated by relatively unskilled personnel in a manufacturing plant.

Figure 2:
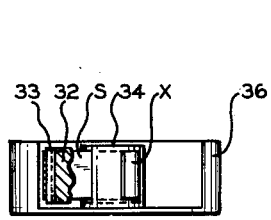
Figure 6:
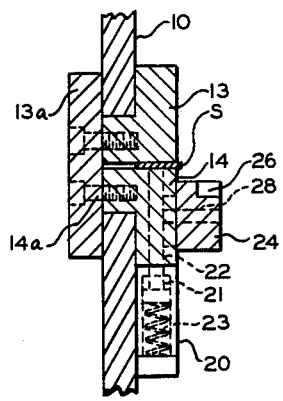
Figure 7:
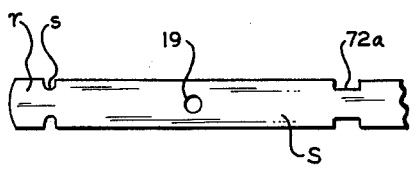
Figure 8:
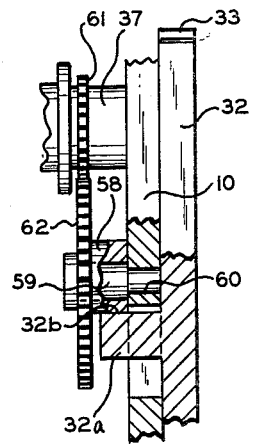
Figure 10:
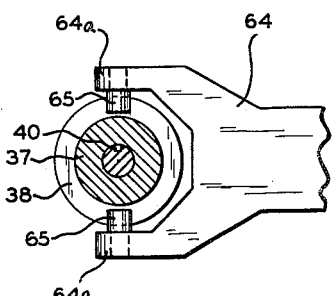
Figure 5:
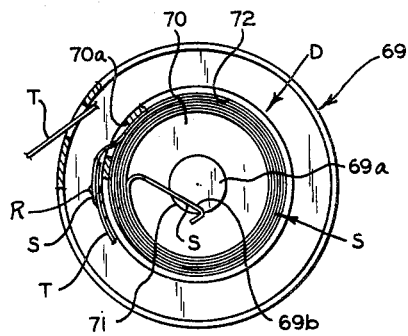
Figure 4:
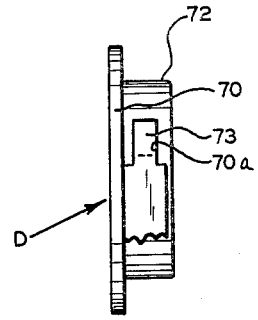
Figure 9:
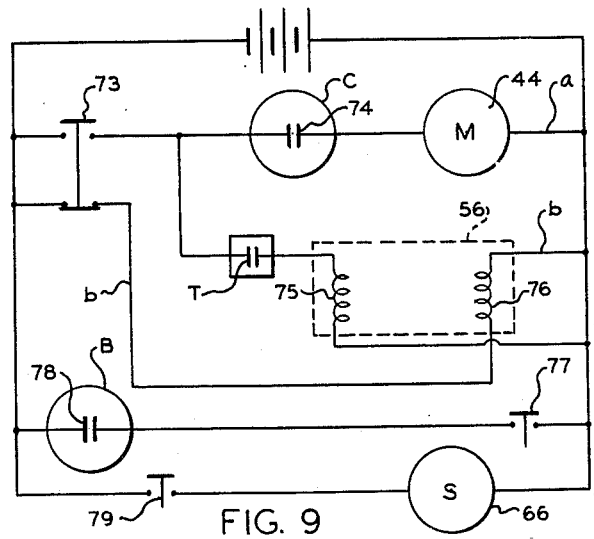

Other objects and advantages of the invention will be pointed out specifically or will become apparent from the following description when it is considered in conjunction with the appended claims and the accompanying drawings, in which:

FIGURE 1 is a front elevational view;
FIGURE 2 is a transverse view taken on the line 2—2 of FIGURE 1;
FIGURE 3 is a top plan view illustrating the machine;
FIGURE 4 is a side elevational view of the spring drum with the spring inside;
FIGURE 5 is a side elevational view of the spring drum assembled inside a tape casing, showing the inner end secured to the center post of the tape measure and the outer end secured to a measuring tape which is wound on the drum;
FIGURE 6 is a transverse, sectional view taken on the line 6—6 of FIGURE 1;
FIGURE 7 is a fragmentary, plan view of the trailing end of the spring strip only;
FIGURE 8 is a fragmentary, top plan view illustrating mechanism for gradually increasing the curvature permanently set in the spring strip;
FIGURE 9 is a circuit diagram illustrating control elements which may be used to operate the mechanism; and
FIGURE 10 is an enlarged, side elevational view illustrating the winding spindle retracting arm.

Referring now more particularly to the accompanying drawings, apparatus for forming and assembling the springs is shown in FIGURE 1, wherein a letter F generally indicates a frame having a front wall 10 provided with a guide slot 11, as shown, within which a guide means generally designated 12 is operable. A guide means 12 comprises a pair of slides 13 and 14 connected with a plate 13a (FIGURE 6) which guides along the inner face of the wall member 10 and is joined to the slides by bolts 14a. The resilient strip S passes between the members 13 and 14 and is guided thereby to a mandrel pin 15 which is shown in FIGURE 1 as disposed outwardly and above the adjoining, parallel, linear surfaces of the guide blocks 13 and 14. A ⅜ inch wide, .006 inch thick strip of S.A.E. 1095–1110 steel is of the type employed.

Spring 16 secured between a post 17 on the lower guide bar 14 and a post 18 on the wall 10 normally maintains the guide means 12 outwardly in the position in which it is shown in solid lines in FIGURE 1. However, it will be seen that the trailing end of the spring strip S (see FIGURE 7) is provided with an opening 19 therein and that the lower guide block 14 has a dependent portion provided with a bore 20 within which is an annular disc or plunger 21 carrying a centrally disposed pin 22 (in the reduced portion 20a of the bore) which is normally pressed upwardly by a coil spring 23 in the bore 20. When the opening 19 in the trailing end of the spring S comes into alignment with the pin 22, the pin 22 passes out of bore portion 20a into the opening 19 in the spring and the guide means 12 will be moved inwardly with the trailing end of the spring strip S to the position in which it is shown in broken lines in FIGURE 1. To release the guide means 12 from the strip S so that the spring 16 will return it to original position, a lever member 24 is provided which is pivoted to the lower block 14 at one end as at 25 and has a finger recess 26 cut therein. Provided in the wall of the cylinder 21 is a slot 27, and a connecting rod 28 which rides in slot 27 joins the disc 21 and lever 24. Thus, to release pin 22 from the opening 19 in spring S, it is only necessary to press the lever member 24 downwardly whence spring 16 is free to return the guide means 12 to initial position.

Provided to fix the mandrel pin 15 in position is a support bracket 29 having slots 30 so that screws 31 can adjustably secure it in position. A reciprocable slide 32 carries mandrel pin 33 which in forward position, as shown in FIGURE 1, is substantially parallel with mandrel pin 15 in the plane of extension of the spring strip S and forms with pin 15 a curvilinear track for the strip S. The pins 15 and 13 may also be termed die means, die surfaces, and die surface means providing a generally curvilinear pathway.

An arbor member 34 comprising winding spindle means is mounted for axial reciprocation on the wall 10 outwardly of the mandrel pins 15 and 33 with its axis generally in horizontal alignment with the pin 15 and it will be seen that the arbor 34 includes a portion having a slot 35 in which the leading end of the spring strip S may be secured by simply bending back its terminal portion as at "x". A semiannular guide 36 concentric with arbor 34 is fixed on the wall 10, as shown to terminate just above the mandrel pin 33 and short of the path of reciprocation of the slide 32.

The arbor 34 is mounted fast on a sleeve member 37 which carries spaced apart, annular plates 38 and member 37 is mounted on a shaft 39 having a keyway 40 provided therein. Pin or key 41 carried by the member 37 extends into the keyway 40 such that sleeve member 37 and arbor 34 will revolve with shaft 39 but can slide axially thereon. Shaft 39 is journaled in a bearing 42 supported from a bottom plate 43 forming part of the frame F which also supports a motor 44, the motor 44 having an armature shaft 45 mounting a drive pulley 46 for driving the arbor 34 through a gear reduction box 47 and a clutch and brake assembly 48. A belt 49 trained around sheave 46 drives a pulley 50 on the input shaft 51 of the speed reducer 47 and the output shaft 52 of the speed reduction mechanism 47 is coupled with the input shaft 53 of the clutch and brake assembly 48 by a coupling 54. The brake and clutch assembly 48 is a conventional mechanism manufactured by the Warner Electric Company which has a magnetic brake and clutch operated in the usual manner and motor 44 is a conventional motor of the type General Electric Company conventionally manufactures.

Slide 32 is connected with the piston rod 55 of a conventional, solenoid operated, double acting air cylinder 56 which is provided with fluid pressure supply lines 57 leading to a suitable source of air pressure in the usual manner. As shown in FIGURE 8, the slide 32 carries a dependent section 32a having a follower surface 32b which, when the slide 32 is in the forward position shown in FIGURE 1, engages a cam 58 fixed on a shaft 59 journaled in a bearing 60 in the wall 10. Cam 58 progressively moves the slide 32 very slightly rearwardly in uniform increments at a constant speed during the forming operation, which has the effect of progressively enlarging the radius of curvature permanently set into the strip S by the mandrels 15 and 33. Actually, the movement is very slight and the curvature set into the strip S progressively increases continously in such a way that the radius of curvature of the increments from the leading end to the trailing end increases almost imperceptibly but gradually from one end of the spring strip to the other in the desired degree. The radius of curvature is not increased to the point where a permanently set radius of curvature would not be set in the strip, of course. Gear 61 mounted on the sleeve 37 is in driving engagement with gear 62 on the shaft 59 and the gears are so sized that the cam 58 finishes one revolution during the time that arbor 34 is winding the spring strip S on the arbor 34.

A bracket 63 supported on wall 10 pivotally carries a lever 64 having a fork end 64a with pins 65 which extend between the plates 38. Solenoid 66 has its armature shaft 67 connected to the opposite end of the lever 64, which is pivotally mounted on the bracket 63 by a pin 68, and when solenoid 66 is energized sleeve 37 on the shaft 39 is retracted and with it the arbor 34. This is accomplished after the spring strip S has been backwound on arbor 34 and after the spring drum D has been placed over the backwound tape and it is desired to release the spring strip S from the arbor 34 to the drum D.

The drum D. which is shown in FIGURES 4 and 5 particularly, is mounted within a measuring tape casing 69 having a center post 69a and includes an end wall 70 with an opening 71 therein for passing center post 69a and a radial wall 72 for retaining the backwound spring S. The wall 72 has an opening 70a (FIGURE 5) of substantially the width of a necked portion 72a of the trailing end of the spring S (see FIGURE 7) which serves to anchor the backwound spring in position. The inner end of measuring tape T has a slit in the usual manner receiving the tongue "r" of the spring strip which has a reduced section "s" of the width of the slit to permit retention of the tape and spring in coupled relation. (See also rivet R.)

In operation the leading end of the spring strip S is passed through the guide means 12 between the guide blocks 13 and 14 and through the slot 35 in the winding spindle 34. The extreme terminal end of the spring is then bent back as in the manner "x" (see FIGURE 1) and thus the leading end of the spring is secured to the winding spindle 34 and will be drawn progressively through the guide means 12 as the spindle or arbor 34 revolves in the direction indicated by the arrow "y."

As indicated in FIGURE 9, a push button 73 may be employed to start the winding operation by energizing motor 44 and closing the operating contacts or relay 74 of clutch C to connect the motor and shaft 39. Conventional, double acting cylinder 56 is also operated to extend the slide 32, which is initially in retracted position, by the push button 73 which after a time delay relay T is closed energizes the solenoid coil 75. Because of the time delay relay T the spindle 34 will wind the spring strip S one or two turns on the spindle 34 before the solenoid 75 snaps slide 32 forwardly. This prevents the slide 32 from pulling the strip S from the slit 35 in the spindle 34. When slide 32 snaps forwardly, the adjacent portion of spring strip S is bent around the mandral 15, as shown in FIGURE 1, and as winding spindle 34 progressively draws the spring strip S from the guide means 12 and between mandrels 15 and 33, a bend is permanently set in the spring strip S. Revolution of the winding spindle 34, of course, also results in revolution of the cam 58 which operates to move mandrel 33 rearwardly progressively in almost imperceptible increments, so that the permanent curvature set in the strip increases during the forming operation. When the terminal end of spring strip S reaches a point in guide means 12 such that the opening 19 is opposite the pin 22, pin 22 is forced upwardly by the spring 23 through the opening 19 and the guide means 12 is carried forwardly (from left to right in FIGURE 1) to the broken line position in which it is shown. As guide means 12 moves forwardly, spring returned push button 73 is released by the operator, which causes the solenoid 76 of double-acting cylinder 56 to be energized while opening circuit line "a" so that slide 32 is sharply withdrawn and moved out of the way of the advancing guide means 12. At the same time, opening of circuit line "a" causes clutch 74 to disengage. Simultaneously the closing of button 77 in circuit line "c" closes brake contacts 78 and causes brake B to be applied. With the brake 76 applied, the spring strip S is then held in backwound position on the winding spindle 34 and button 77 may be of the spring returned type which can, however, be locked in depressed position mechanically. The drum D is then placed axially, wall 72 foremost, over the coiled, backwound strip S with the wall 72 being guided by the wall 36 of the guide. When the slide 32 is withdrawn, it withdraws to the fully retracted position in which it is shown in diagrammatic lines so that it holds the trailing end of spring strip S out of the guide 36 area in a position in which it can be grasped. If drum casing D is tilted with its portion adjacent the mandrel 15 raised as it is applied over the backwound strip held on arbor 34, the trailing end of the spring strip S can be brought through the opening 70a which is of sufficient length to pass the width of the spring strip S. To accomplish this, the spring strip S must be turned 90° and then, once the neck portion 72a is passing out opening 70a, the extreme, trailing end of the spring strip S is permitted to return to normal position again, as in FIGURE 4. With the wall 72 in position then around the backwound strip S on arbor 34 and the trailing end passing out slot 70a and being held by the inner shoulder adjacent the neck portion 72a bearing against the inner periphery of the annular wall 72 of drum D, the spring strip S can then be released and permited to expand against the inner periphery of the wall 72 of drum D, as shown in FIGURE 5. Brake B is deenergized by releasing push button 77. First of all, spring returned push button 79 is depressed, however, to energize solenoid 66 so that fork arm 64 pivots about pin 68 to retract the winding spindle 34 axially. It is only when gear 61 clears gear 62, which occurs almost immediately as sleeve 37 moves outwardly or retracts, that brake B is released. Then spindle 34 is free to turn in the opposite direction relative to direction "y" and the spring is expanded within drum D by the time the strip S leaves spindle 34. The drum D can then be lifted off and simply set in position over the center post 69a in the measuring tape casing, the innermost end of spring strip S being inserted through the slot 69b in the center post 69a to secure the inner end of the spring in position. The release of push button 79 deenergizes solenoid 66 and restores the winding spindle 34 to original position, ready for winding of the next spring strip S.

The electrical circuitry shown in FIGURE 9 is intended only to be illustrative of a system which might be employed to conveniently operate the various elements. Actually, the various elements, including the clutch and brake, could be hand operated, if desired, or to make the operation more automatic limit switches could be used in place of some of the push buttons shown. The diameter of pins 15 and 33 which permanently set the strip S is in the apparatus shown ⅛ of an inch and the diameter of winding spindle 34 is ⅝ of an inch. If the latter diameter is less any appreciable dimension, the permanent set imparted by pins 15 and 33 would be removed and the spring strip S would fracture during back winding.

Once the spring strip S has been mounted inside the tape measure casing C it will operate to draw the measuring tape extended inwardly into the casing at a generally constant speed. When a long length of tape is extended from the tape casing C, the force tending to retract the tape will be a little greater because the curvature set in the leading end of the spring (now the inner end) is a little more acute. Since it is the inner end of the spring strip spring in FIGURE 5 which has the more acute radius, the greater power or force is available immediately to start the length of tape winding in. It is this inner end with the most acute permanent set that also is normally disposed in a most acute backwound or reversed curvature, even though this latter curvature is not sufficient to reverse or materially affect the permanent set imparted to the strip. If the situation were reversed, the maximum power of the spring would not be immediately available unless the whole of the tape measure were substantially withdrawn so that the whole of the backwound spring strip would be exerting a withdrawing force. The extreme ends of the strip S are free of permanent set in the practice of this method and so are easily coupled in position.

It should be apparent that we have perfected a method of forming Spir'ator type springs and assembling a wound spring within a spring drum which is a considerable improvement over known methods of which we are aware.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. Apparatus for making a power spring comprising frame means; generally parallel guide means through which a spring strip is to pass mounted for reciprocating movement in a pathway on said frame means to and fro; a first pin of small diameter on said frame means adjacent the pathway of movement of said guide means, a second pin of small diameter mounted for substantially reciprocating movement on said frame means in a path angular to said pathway from a position remote from said first pin to a position side-by-side with said first pin to form therewith a curvilinear track for the strip passing between said pins; an arbor of large diameter relative to said pins rotatably supported adjacent said pins outward thereof; means for revolving said arbor in a direction to backwind said strip after it has been permanently set in a curvature in passing between said pins; means connected with said guide means for gripping the end of said strip which last passes through said guide means and permitting the strip to draw said guide means toward said pins at the end of the forming operation; means for withdrawing said second pin to its remote position; and means actuatable to release said gripping means from the trailing end.

2. The combination defined in claim 1 in which a slide carries said second pin which withdraws to a remote position in which the said second pin is adjacent said arbor and holds the trailing end of the strip from the arbor when said gripping means is released.

3. The combination defined in claim 1 in which said arbor has a slot within which the leading end of the strip is received and said arbor is withdrawn axially.

4. Apparatus for making a power spring from a resilient strip comprising; frame means; generally parallel guide means through which said strip is to pass mounted for reciprocating movement in a pathway on said frame means; die means on said frame means adjacent the pathway of movement of said guide means including a part mounted for substantially reciprocating movement on said frame means in a path angular to said pathway to and from a position remote from said guide means pathway; said die means being disposed to produce a relatively acute bend in said strip in successive lengthwise increments of the strip of small enough radius to bend each increment beyond its yield point and provide a permanently set portion having lengthwise curved increments with a predetermined radius of curvature; means receiving the leading end of said strip and preventing it from naturally winding into a planar coil while backwinding said strip into a planar coil of opposite curvature in which the said set curvature is forced inside out and successive increments of the length of the strip are disposed in a state of opposite curvature of sufficiently greater radius not exceeding the yield point of the material so that it holds substantially the said set; means connected with said guide means for gripping the end of said strip which last passes through said die means and permitting the strip to draw said guide means toward said die means at the end of the forming operation; means for withdrawing said die means part to its remote position; and means actuatable to release said gripping means from the trailing end of said strip.

5. The combination defined in claim 4 in which said gripping means comprises a spring-pressed, retractable pin carried by said guide means which enters an opening in the spring strip.

6. Apparatus for making a power spring strip comprising: die surface means providing a generally curvilinear pathway formed to produce a relatively acute bend in successive increments of a resilient spring strip passed in the pathway, the bend produced being of small enough radius to bend each increment beyond its yield point and provide a permanently set portion having lengthwise curved increments with a predetermined curvature; winding spindle means, including a portion mounted for axial reciprocation and for rotation, receiving the leading end of a strip issuing from said pathway; means for said portion of the winding spindle means to releasably secure thereto one end of said bent spring strip in a manner to release said end of the strip when said portion of the winding spindle means is moved axially out of the plane of the strip; means for revolving said portion of the winding spindle means in a direction to reverse the bend set in the strip and backwind said strip on said winding spindle means in successive, planar convolutions of sufficiently large diameter that the strip is not substantially again stressed beyond its yield point and the set previously imparted is held; and means for moving said portion of the winding spindle means axially out of the plane of said strip to release said end of the strip.

References Cited in the file of this patent
UNITED STATES PATENTS

| | | |
|---|---|---|
| 1,790,218 | Appleby | Jan. 27, 1931 |
| 2,176,719 | Peyton | Oct. 17, 1939 |
| 2,177,260 | Laube | Oct. 24, 1939 |
| 2,324,115 | Schultz | July 13, 1943 |
| 2,388,537 | Hallstrom et al. | Nov. 6, 1945 |
| 2,609,191 | Foster | Sept. 2, 1952 |
| 2,647,743 | Cook | Aug. 4, 1953 |
| 2,801,669 | Lermont | Aug. 6, 1957 |
| 2,833,027 | Foster | May 6, 1958 |
| 2,868,268 | Lewis et al. | Jan. 13, 1959 |